United States Patent
Reese et al.

(10) Patent No.: US 11,254,436 B1
(45) Date of Patent: Feb. 22, 2022

(54) HYBRID ROTARY DRONE AND METHOD OF USE

(71) Applicants: Isaac Reese, Houston, TX (US); Jacob Brazda, Rose Hill, KS (US)

(72) Inventors: Isaac Reese, Houston, TX (US); Jacob Brazda, Rose Hill, KS (US)

( * ) Notice: Subject to any disclaimer, the term of this patent is extended or adjusted under 35 U.S.C. 154(b) by 292 days.

(21) Appl. No.: 16/447,231

(22) Filed: Jun. 20, 2019

Related U.S. Application Data

(63) Continuation-in-part of application No. 15/356,364, filed on Nov. 18, 2016, now Pat. No. 10,343,785.

(51) Int. Cl.
*B64C 39/02* (2006.01)
*B64D 27/02* (2006.01)
*B64D 27/10* (2006.01)
*B64D 27/24* (2006.01)

(52) U.S. Cl.
CPC ............ *B64D 27/02* (2013.01); *B64C 39/024* (2013.01); *B64D 27/10* (2013.01); *B64D 27/24* (2013.01); *B64C 2201/027* (2013.01); *B64C 2201/042* (2013.01); *B64C 2201/046* (2013.01); *B64D 2027/026* (2013.01)

(58) Field of Classification Search
CPC ........ B64C 2201/027; B64C 2201/042; B64C 2201/044; B64C 2201/108; B64C 2201/165; B64D 2027/026
See application file for complete search history.

(56) References Cited

U.S. PATENT DOCUMENTS

| | | | | |
|---|---|---|---|---|
| 9,561,860 B2 * | 2/2017 | Knapp | ................ | G08G 5/0034 |
| 9,751,625 B2 * | 9/2017 | Phan | .................... | B64D 33/08 |
| 9,751,626 B2 * | 9/2017 | Phan | ..................... | B64F 3/02 |
| 9,764,837 B2 * | 9/2017 | Phan | ..................... | B64C 27/08 |
| 10,308,358 B2 * | 6/2019 | Phan | .................... | B64C 39/026 |
| 10,501,194 B2 * | 12/2019 | Knapp | ................ | G08G 5/0034 |
| 2016/0137304 A1 * | 5/2016 | Phan | .................... | B64C 39/024 244/17.23 |
| 2016/0236790 A1 * | 8/2016 | Knapp | ................... | B64C 11/44 |
| 2016/0311544 A1 * | 10/2016 | Phan | ..................... | B64F 3/02 |
| 2016/0376005 A1 * | 12/2016 | Phan | ..................... | B64D 1/22 244/2 |
| 2017/0066531 A1 * | 3/2017 | McAdoo | ................. | H02J 7/14 |
| 2018/0022452 A1 * | 1/2018 | Phan | .................... | B64C 27/08 244/17.23 |
| 2018/0134400 A1 * | 5/2018 | Knapp | ................... | B64D 27/24 |
| 2018/0237138 A1 * | 8/2018 | Phan | ................... | G08G 5/0056 |
| 2018/0244384 A1 * | 8/2018 | Phan | ................... | B64D 27/24 |
| 2019/0283874 A1 * | 9/2019 | Phan | .................... | B64C 39/022 |
| 2020/0290742 A1 * | 9/2020 | Kumar | .................. | B64D 27/24 |

* cited by examiner

*Primary Examiner* — Philip J Bonzell
(74) *Attorney, Agent, or Firm* — Leavitt Eldredge Law Firm

(57) ABSTRACT

A hybrid rotary aircraft includes a body having an inner area; a plurality of arms rigidly attached to and extending from the body; a plurality of rotor assemblies pivotally engaged with the plurality of arms; a first gas engine; and a first brushless electric generator rotatably attached to the first gas engine and conductively coupled to each of the brushless electric motors. The plurality of rotor assemblies each having a brushless electric motor; and a rotor blades rotatably attached to the brushless electric motor.

5 Claims, 6 Drawing Sheets

HYBRID ROTARY DRONE AND METHOD OF USE

BACKGROUND

1. Field of the Invention

The present invention relates generally to rotary aircraft, and more specifically, to a hybrid drone and method of use.

2. Description of Related Art

Drones are well known in the art. For example, FIG. 1 depicts an oblique view of a drone 101 having a body 105 with a plurality of rotary assemblies 103 secured thereto. One or more legs 107 extend from the lower portion of the body 105 and are configured to provide landing support. The batteries and control system (not shown) are disposed within body 105 and are configured to power and manipulate the rotor assemblies 103.

One of the problems commonly associated with drone 101 is the weight of the batteries. Specifically, the drone is required to reduce the weight of the battery to provide adequate lift-to-weight ratio for flight. The limited battery size greatly reduces the hours of flight. It should be understood that as the size of the vehicle increases, the cost, volume, and weight of batteries become the limiting design challenge. The power density of typical batteries used in the multi-rotor electric aircraft is substantially less than that of convention gasoline or diesel.

Accordingly, although great strides have been made in the area of drones, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
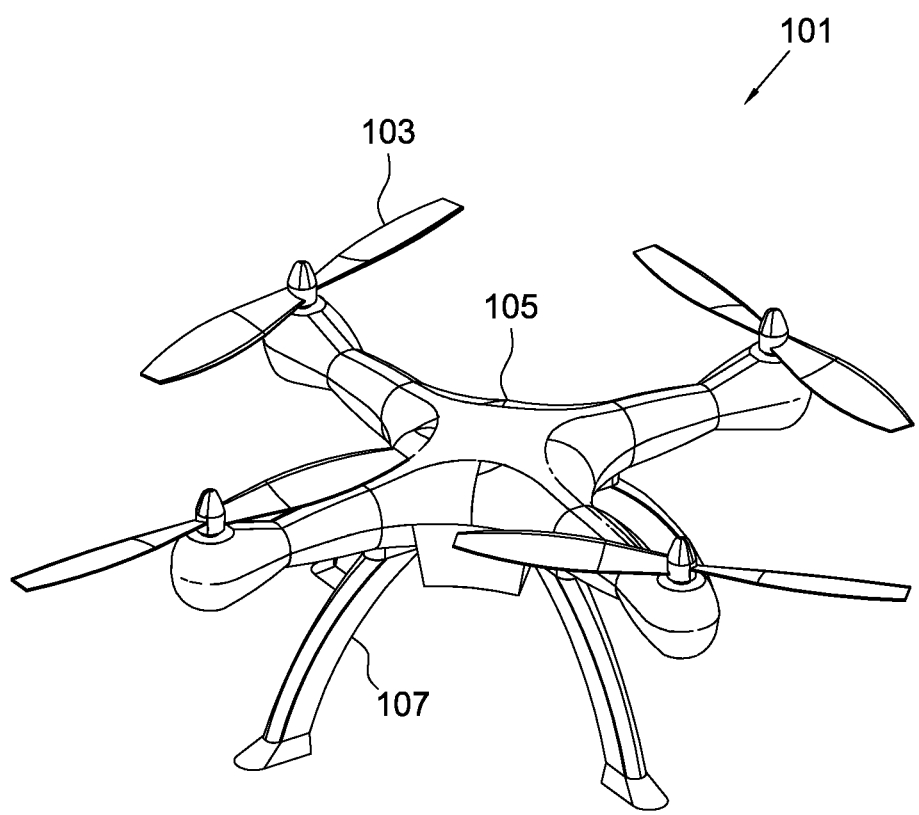
FIG. 1 is an oblique view of a conventional drone.
Figure 2:
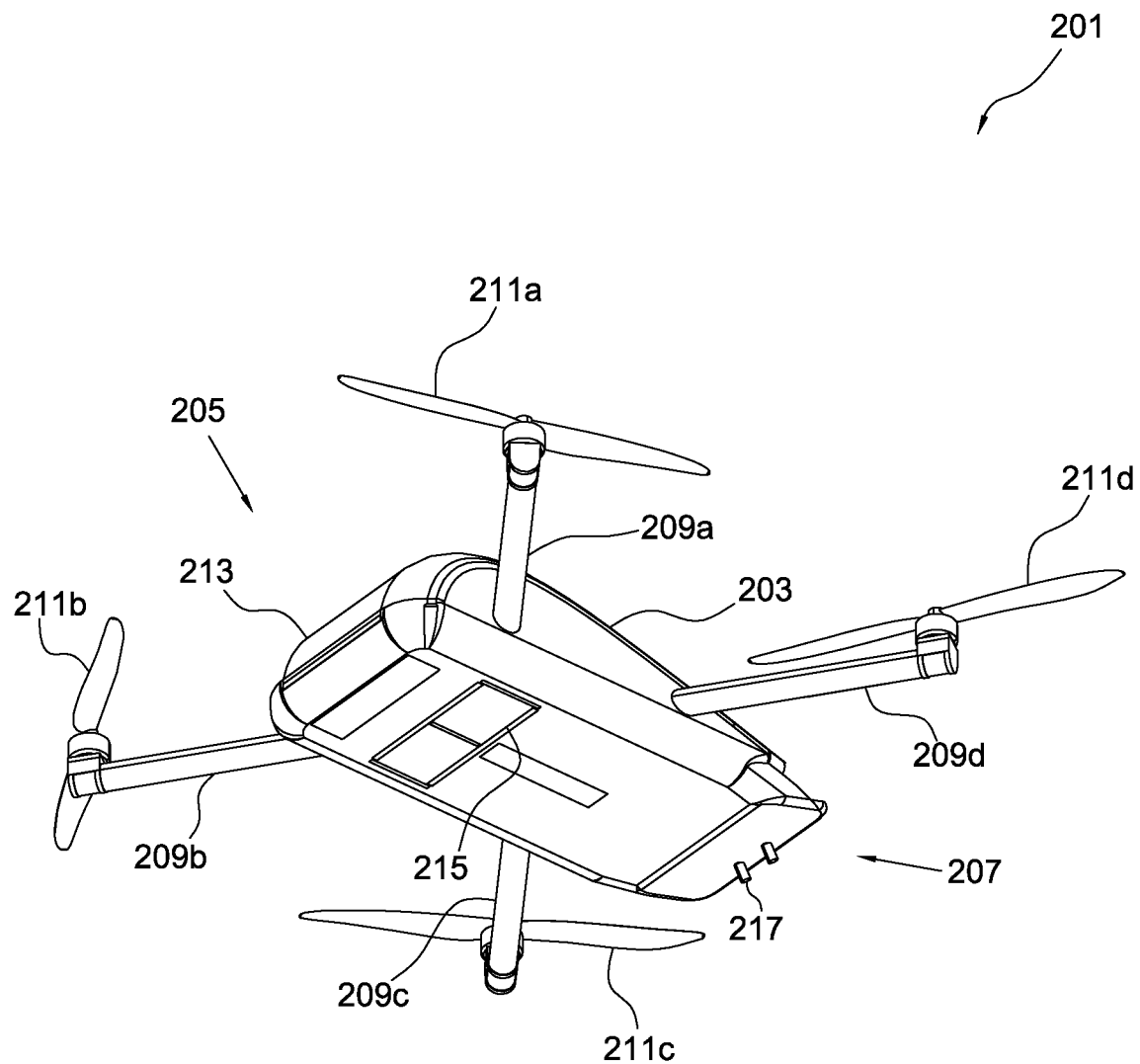
FIG. 2 is a bottom oblique view of a drone in accordance with a preferred embodiment of the present invention.
Figure 3:
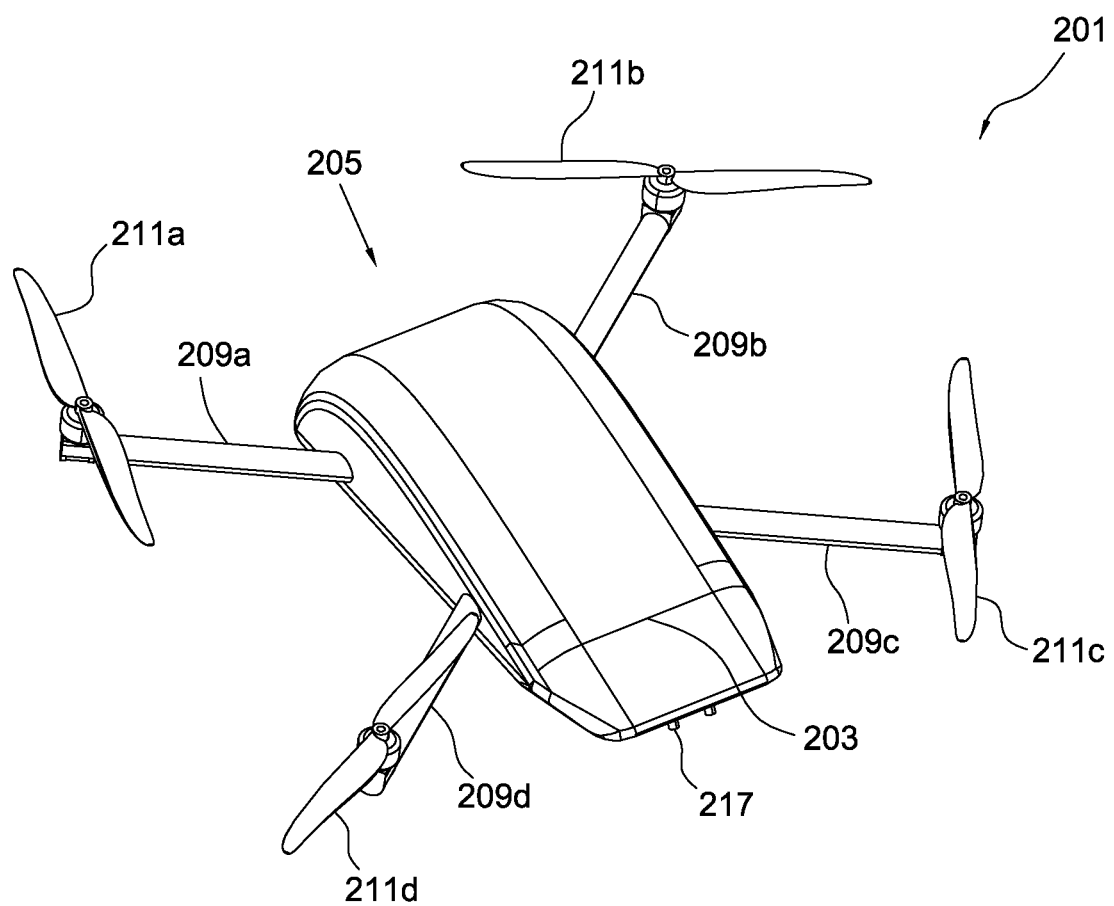
FIG. 3 is a top oblique view of the drone of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional rotary aircraft systems. Specifically, the present invention includes the feature of providing power to the rotary assemblies via a gas engine and a brushless electric generator. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-5 depict various views of a drone 201 in accordance with a preferred embodiment of the present application. It will be appreciated that drone 201 overcomes one or more of the above-listed problems commonly associated with conventional drones.

In the contemplated embodiment, drone 201 includes one or more of a body 203 with an inner area configured to carry a power assembly 401 therein. The body 203 is preferably contoured with a greater height at front surface 205 and gradually contours downwardly to a back surface. A plurality of arms 209a, 209b, 209c, and 209d rigidly attach to body 203 in a fixed position and are adapted to carry respective rotor assemblies 211a, 211b, 211c, and 211d that provide lift. Each rotor assembly includes brushless electric motors configured to rotate a rotor blade.

Figure 4:
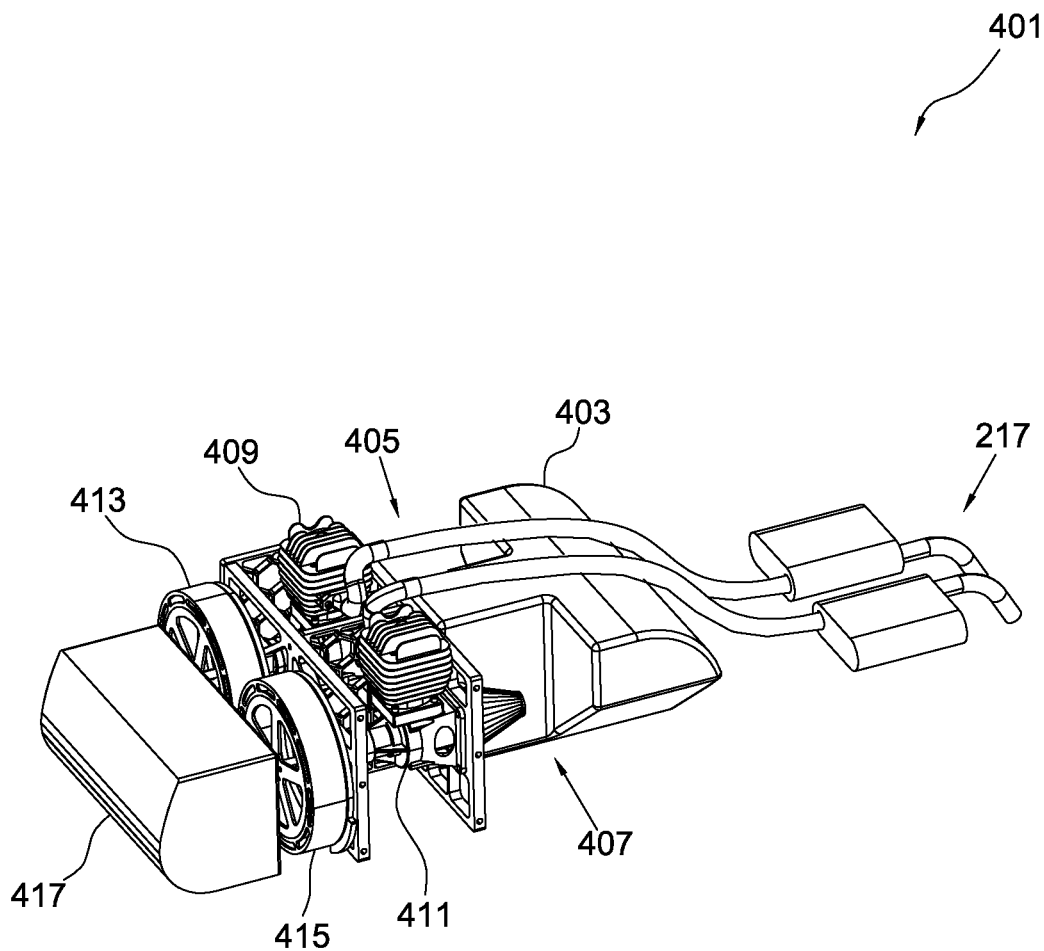
FIG. 4 is an oblique view of the power assembly of the drone of FIG. 1.

Referring specifically to FIG. 4, an oblique view of the power assembly 401 is shown having a gas tank 403 with air intake openings 405, 407 in gaseous communication with respective exhaust ports of gas engines 409, 411. During use, the exhaust from the engines pass through an exhaust system 217 configured channel the gas to the rear back surface of the body. The gas engines 409, 411 are rigidly attached to a frame and rotatably attached to respective brushless electric generators 413, 415 configured to generate electrical power to power the 3-phrase brushless motors of the rotor assemblies. An electronic housing compartment 417 would be utilized to store the battery, the flight hardware, and the CPU. The on-board battery would be utilized to start the gas engine.

One of the unique features believed characteristic of the present invention is the reduced size of the battery pack. In lieu of providing electrical power to the motors via a battery, the present invention utilizes a gas engine to rotate and to produce power to the rotor assemblies via the generators. In the contemplated embodiment, the on-board battery only functions to start the engine and to power the electronics offline.

Figure 5:
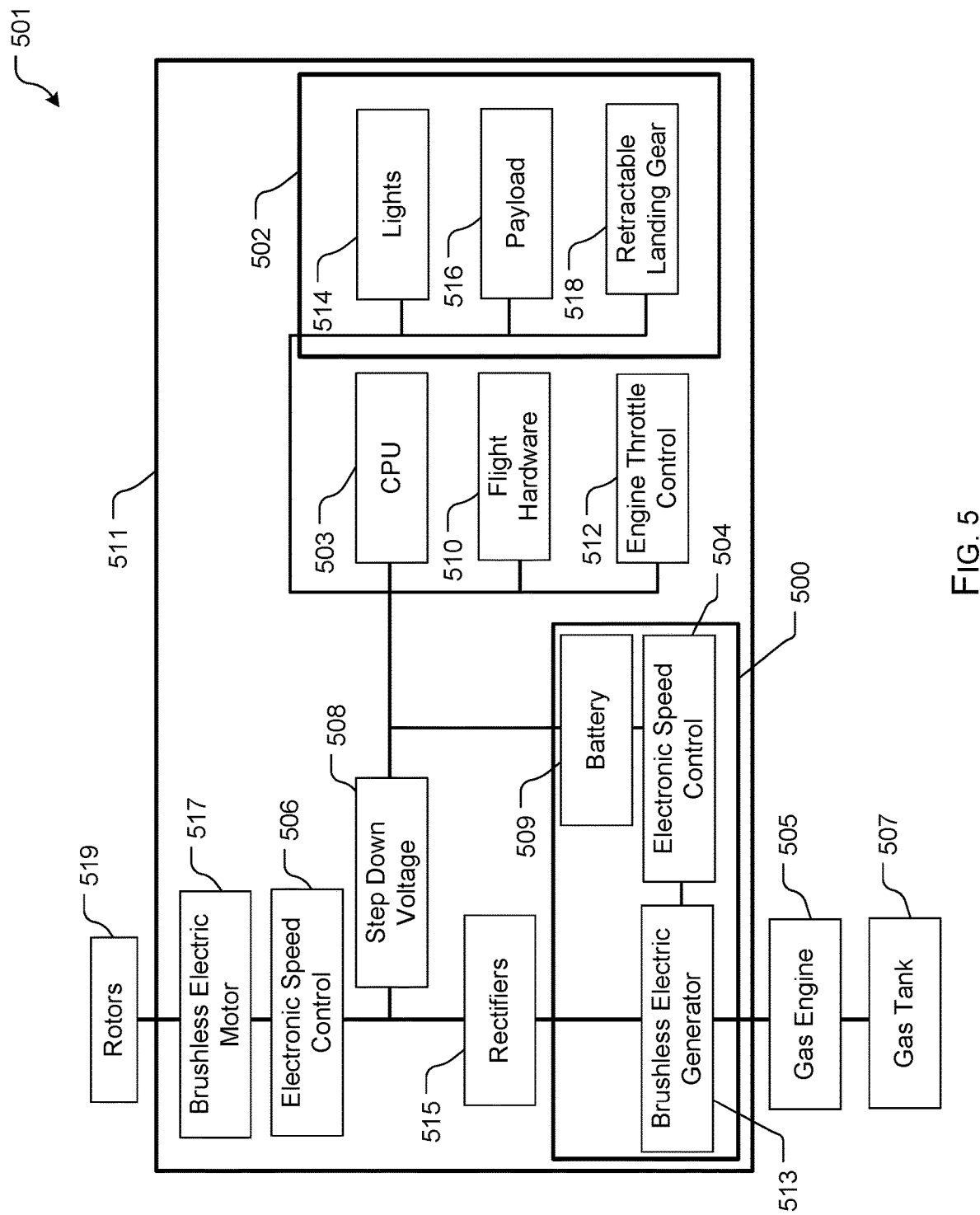
FIG. 5 is a simplified schematic of the components of the drone of FIG. 1.

In FIG. 5, a simplified schematic 501 of the components of drone 201 are shown. The schematic 501 includes the electrical system 511 with an engine starter circuit 500 with an optional component package 502.

In the exemplary embodiment, the gas engine 505 is in gaseous communication with a gas tank 507 and configured to rotate generator 513, which in turn is conductively coupled to the brushless electric motor 517 via a rectifier 515. The generator 513 is also conductively coupled to the battery 509 via an electronic speed control device 504. Although shown with one generator, it should be understood that the system in contemplated utilizing redundant generators in the preferred embodiment.

A computer 503 is operably associated with the gas engine 505, brushless electric generator 513, the brushless electric motor 517, and the other devices of drone 201. The CPU 503 regulates the speed control 506 and speed control 504 via digital or analog control wires and is powered via the step down voltage device 508 and the battery 509. An electronic speed control 506 is conductively coupled to the motor 517 and rectifier 515. A plurality of rotors 519 are rotatably attached to motor 517 and are configured to provide lift. The CPU 503 is also in data communication with the flight hardware 510 and the engine throttle control 512 for manipulating engine power output. An optional package 502 is also contemplated and includes one or more lights 514, payload 516, and retractable landing gear 518. These optional devices are controlled by computer 503.

Figure 6:
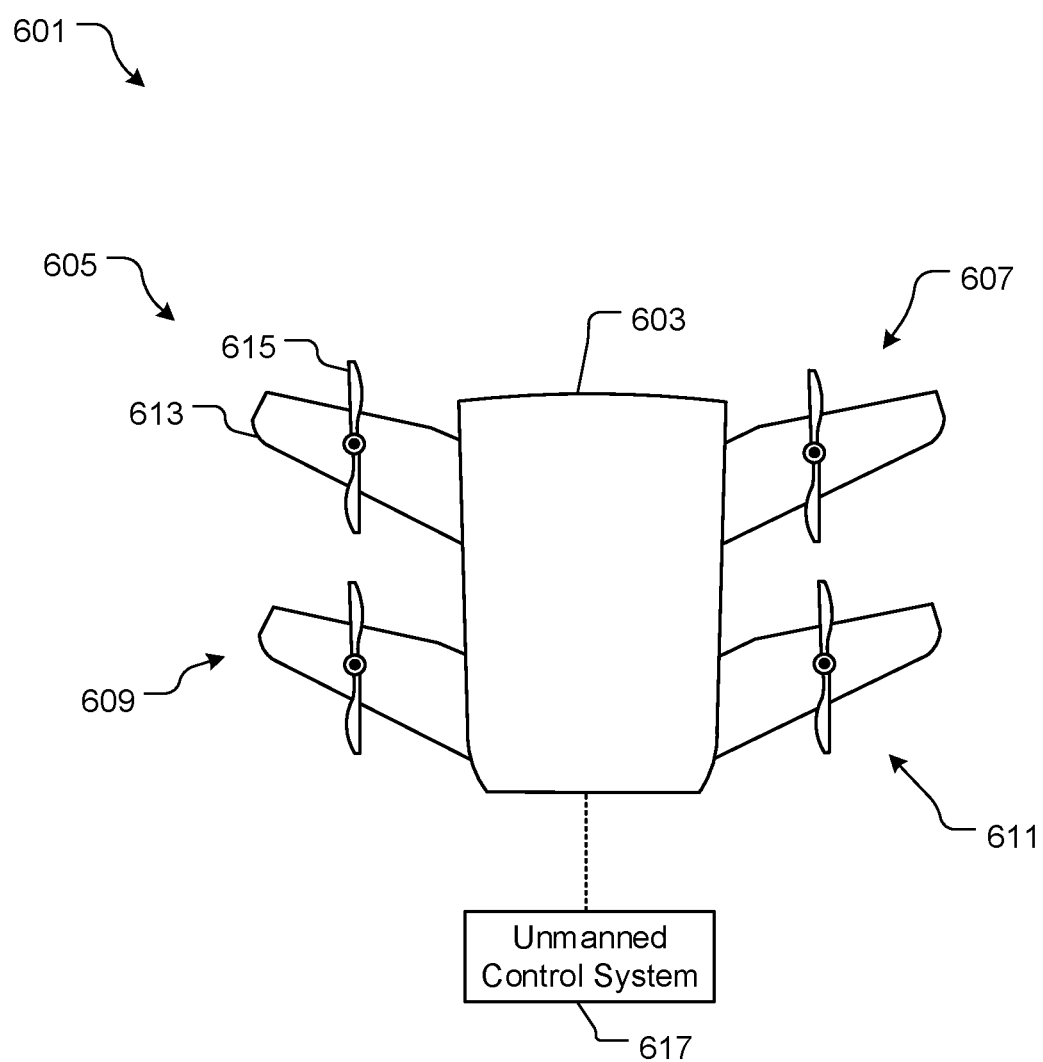
FIG. 6 is a top view of an alternative embodiment of an aircraft in accordance with the present application.

In FIG. 6, a simplified top view of an alternative embodiment of an aircraft 601 is shown. It should be appreciated that the features discussed herein can be interchanged between embodiments as necessary. In this embodiment, the aircraft 601 includes a body 603 with a plurality of arms 605, 607, 609, 611 extending therefrom. The plurality of arms each include a wing 613 and a rotor assembly 615. It should be appreciated that this configuration allows for the aircraft to fly via fixed wings and hover, takeoff, and land in the multi-rotor configuration. In some embodiments, the aircraft is further configured with an unmanned control system 617 thereby allowing for flight in a manned or unmanned fashion.

In FIG. 7, a schematic depicts an alternative power system in accordance with the present application. As shown, the system can include a gas tank 701 in fluid communication with one or more engines 703 coupled to a brushless generator 705 and a relay/switch 707, all connected to a control circuit 709. A BUS terminal 711 is coupled to one or more rectifiers 713 yet further coupled to one or more electric speed controls 715, to one or more brushless electric motors 717, to one or more propeller lifts 719. This system is configured to rectify AC output to DC power. This system further includes an output voltage step down 721 which is electrically coupled to other components, such as a CPU 723, flight hardware 725, flight telemetry 727, a battery 729, lights 731, sensors 733, landing gear 735, and a payload 737.

In FIG. 8, another schematic depicts another alternative power system in accordance with the present application. As shown, the system can include a gas tank 801 in fluid communication with one or more engines 803 coupled to a brushless generator 805 and a relay/switch 807, all connected to a control circuit 809. In this embodiment, a BUS terminal 811 is coupled to one or more variable frequency drives 813 yet further coupled to one or more brushless electric motors 817, to one or more propeller lifts 819. In this embodiment, the one or more variable frequency drives are configured to receive AC power to control the one or more brushless electric motors. The system further includes a rectifier 821 coupled to an output voltage step down 823 which is electrically coupled to other components, such as a CPU 825, flight hardware 827, flight telemetry 829, a battery 831, lights 833, sensors 835, landing gear 837, and a payload 839.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A hybrid rotary aircraft, comprising:
   a body extending from a front surface to a back surface, the body further having an inner area;
   a plurality of arms rigidly attached to and extending from the body;
   a plurality of rotor assemblies engaged with the plurality of arms, the plurality of rotor assemblies each having a rotor;
   a power source coupled to a brushless electric motor and housed within the inner area of the body, the power source having:
      one or more gas engines; and
      one or more brushless generators conductively coupled to a battery; and
   an electronic speed controller conductively coupled to both the brushless electric generator and the battery, the electronic speed controller is configured to control the speed of the rotor;
   wherein the one or more brushless generators generate electrical power to be transferred directly to the brushless electric motors without the brushless electric motors receiving power from the battery.

2. The aircraft of claim 1, wherein the plurality of arms each further comprise:
   a wing configured to support the rotor;
   wherein the plurality of arms are configured to operate in a fixed wing flight and a multi-rotor flight.

3. The aircraft of claim 1, further comprising:
   an unmanned control system configured to operate the aircraft.

4. The aircraft of claim 1, further comprising:
   a gas tank in fluid communication with the one or more gas engines.

5. The aircraft of claim 1, further comprising:
   an onboard computer; and the battery is conductively coupled to the onboard computer, the one or more gas engines, and the one or more brushless electric generators.

\* \* \* \* \*